US008654263B2

(12) United States Patent
Chang

(10) Patent No.: US 8,654,263 B2
(45) Date of Patent: Feb. 18, 2014

(54) BROADCAST RECEIVING APPARATUS TO MINIMIZE STANDBY POWER AND METHOD THEREOF

(75) Inventor: Dong-hyun Chang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1556 days.

(21) Appl. No.: 11/652,002

(22) Filed: Jan. 11, 2007

(65) Prior Publication Data
US 2008/0030624 A1   Feb. 7, 2008

(30) Foreign Application Priority Data
Aug. 2, 2006   (KR) .................. 10-2006-0072880

(51) Int. Cl.
  H04N 5/44   (2011.01)
  H04N 5/64   (2006.01)
(52) U.S. Cl.
  USPC ........................... 348/730; 348/552; 348/553
(58) Field of Classification Search
  USPC .......... 725/133, 141, 153; 361/93.1; 348/730, 348/705–706, 552, 725
  See application file for complete search history.

(56) References Cited

U.S. PATENT DOCUMENTS

| 6,690,431 | B1* | 2/2004 | Yang et al. | 348/706 |
| 7,456,906 | B2* | 11/2008 | Shimizu et al. | 348/730 |
| 7,562,242 | B2* | 7/2009 | Hori | 713/324 |
| 7,768,579 | B2* | 8/2010 | Huang et al. | 348/730 |
| 7,880,811 | B2* | 2/2011 | Takahashi | 348/552 |
| 2005/0157216 | A1 | 7/2005 | Shimizu et al. |  |
| 2005/0162282 | A1 | 7/2005 | Dresti et al. |  |
| 2006/0109384 | A1* | 5/2006 | Miller-Smith et al. | 348/730 |

FOREIGN PATENT DOCUMENTS

| CN | 1289165 A | 3/2001 |
| CN | 1783942 A | 6/2006 |
| DE | 93 12 619 U1 | 10/1993 |
| DE | 197 10 944 A1 | 9/1998 |
| JP | 2005-236945 | 9/2005 |
| KR | 10-2004-0087727 | 10/2004 |
| WO | 20041057862 A1 | 7/2004 |

OTHER PUBLICATIONS

Chinese Office Action issued Dec. 12, 2008 in CN Application No. 200710085505.2.
Extended European Search Report issued in European Patent Application No. 07108453.7 on Jul. 14, 2011.
Korean Office Action for application 10-2006-0072880 dated Jul. 18, 2012.

* cited by examiner

Primary Examiner — Trang U Tran
(74) Attorney, Agent, or Firm — Stanzione & Kim, LLP

(57) ABSTRACT

A broadcast receiving apparatus to minimize standby power and a method thereof. The broadcast receiving apparatus includes a sensor to detect variation in an inputted alternating current (AC) voltage and outputting a direct current (DC) voltage corresponding to the detection result, and a controller to detect variation in currents based on a digital voltage corresponding to the DC voltage and to determine the on/off state of an external apparatus, connected to the broadcast receiving apparatus, according to the detection result of the controller. Therefore, it is possible to determine whether the external apparatus is switched on or off according to a variation in power supplied to the external apparatus, to cut off a power supplied to the external apparatus based on the determination result, and to selectively control a power supplied to components of the broadcast receiving apparatus based on power saving data.

23 Claims, 3 Drawing Sheets

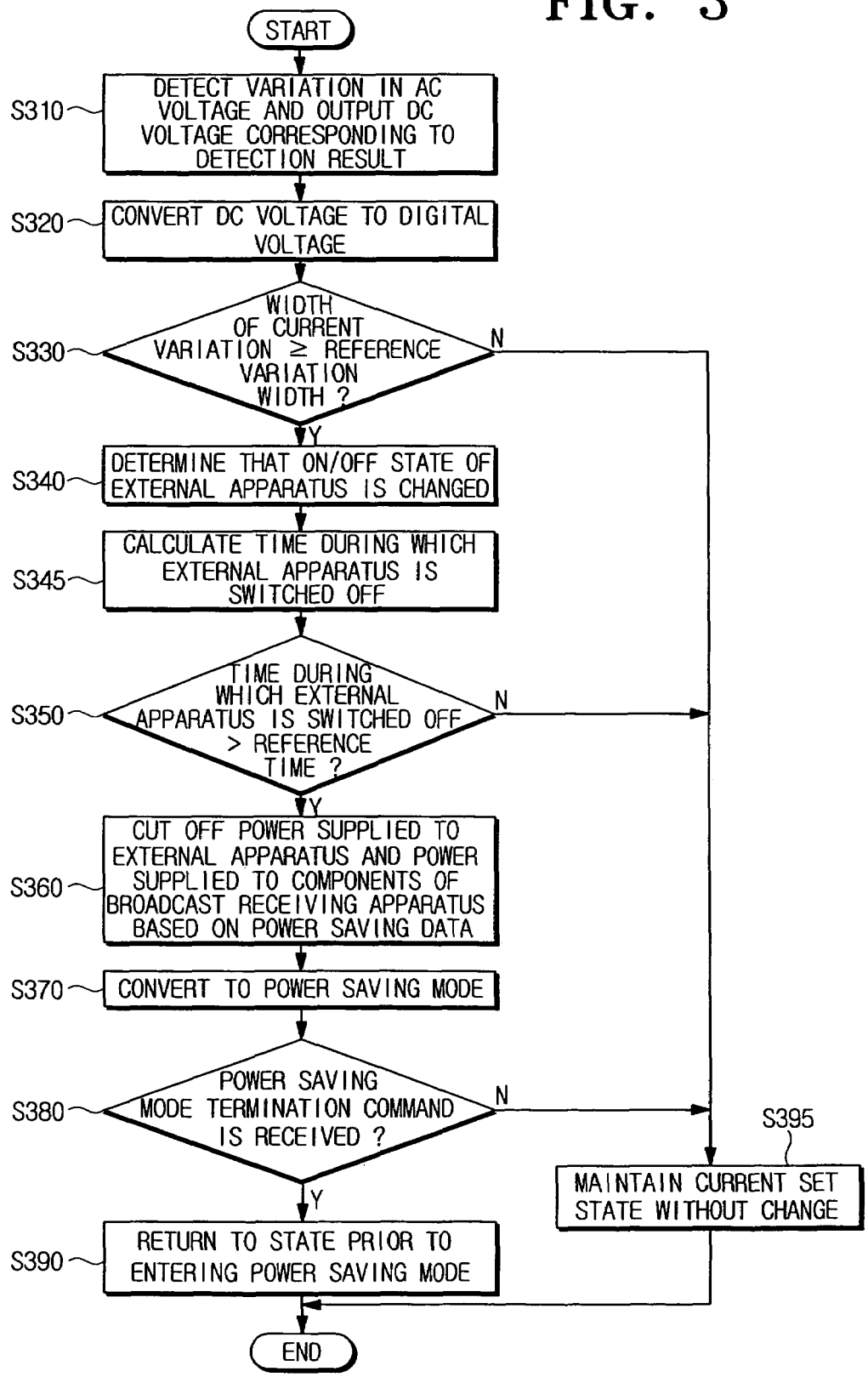

000
BROADCAST RECEIVING APPARATUS TO MINIMIZE STANDBY POWER AND METHOD THEREOF

CROSS-REFERENCE TO RELATED APPLICATIONS

This application claims priority under 35 U.S.C. §119 (a) of Korean Patent Application No. 10-2006-0072880, filed on Aug. 2, 2006, in the Korean Intellectual Property Office, the entire disclosure of which is hereby incorporated by reference.

BACKGROUND OF THE INVENTION

1. Field of the Invention

The present general inventive concept relates to a broadcast receiving apparatus to minimize standby power used, and a method thereof. More particularly, the present general inventive concept relates to a broadcast receiving apparatus, and a method thereof which is capable of converting to a mode to save power in response to an on/off state of an external apparatus connected thereto.

2. Description of the Related Art

Two screen display methods for video signals are an interlaced scanning method and a progressive scanning method. The progressive scanning method is used in computer monitors, digital TVs, digital video recorders (DVRs), etc., to display a whole frame at once using one image frame as a frame unit in a manner similar to the manner in which a film is projected onto a screen. The interlaced scanning method is used in analog TV broadcasting to display odd lines of a screen first and then even lines.

Generally, a broadcast receiving apparatus, as an apparatus which receives digital satellite broadcasting, converts a digital broadcast or an analog broadcast transmitted from a broadcasting station and video and audio signals inputted from various external apparatus, such as video players, DVD players, and the like, into a transport stream (TS) signal to transmit to a display device. A representative example of the above broadcast receiving apparatus includes a set-top box, which connects a television to other external signal sources.

A set-top box converts a signal to content to be displayed on a screen. The signal source may be an Ethernet cable, a satellite dish, a coaxial cable, a television line, or even an ordinary very high frequency (VHF) or ultra high frequency (UHF) antenna. At this time, the content may include video, audio, Internet webpages, interactive games, or other possibilities.

FIG. 1 is a block diagram illustrating a conventional broadcast receiving apparatus. The broadcast receiving apparatus in FIG. 1 comprises a tuner 10, a signal processor 20, a controller 30, a switching part 40, and a power supplier 50.

The tuner 10 receives and tunes a broadcast signal corresponding to a channel selected by a user from the broadcasting station.

The signal processor 20 processes the broadcast signal provided from the tuner 10 to output video, audio and data signals separately.

The controller 30 determines whether a channel of a broadcast receiving apparatus 100 is changed, and controls the switching part 40 to cut off the power supplied to an external apparatus 200 based on the results of the determining step.

Specifically, if the channel of the broadcast receiving apparatus 100 is not changed for a preset predetermined period of time, the controller 30 controls the switching part 40 so that the power supplied from the power supplier 50 is not supplied to the external apparatus 200.

However, since it is determined that a user is not viewing the broadcast according to the result of determining whether a user is viewing the broadcast based on whether the channel has changed, power transmission to both the broadcast receiving apparatus and the external apparatus connected to the broadcast receiving apparatus is suspended simultaneously. In this case, when the user views the broadcast for a long period of time without changing the channel, the conventional broadcast receiving apparatus determines that the user is not viewing the broadcast, so power transmission to the broadcast receiving apparatus is suspended. Therefore, it is difficult to control an alternating current power of the external apparatus at a desired time.

SUMMARY OF THE INVENTION

The present general inventive concept provides a broadcast receiving apparatus, and a method thereof, which can determine an on/off state of an external apparatus according to variation in power supplied to the external apparatus, and change a mode of the broadcast receiving apparatus to a power saving mode based on the determination result to cut off the power supplied to the external apparatus.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a broadcast receiving apparatus including a sensor, which detects variation in an input alternating current (AC) voltage and outputs a direct current (DC) voltage corresponding to a detection result, and a controller, which detects variation in current based on a digital voltage corresponding to the DC voltage and determines an on/off state of an external apparatus, connected to the broadcast receiving apparatus, according to the detection result.

The broadcast receiving apparatus may further include an analog-to-digital (A/D) converter, which converts the DC voltage to the digital voltage. The controller may detect the variation in the current based on the digital voltage received from the A/D converter to determine the on/off state of the external apparatus.

The controller may determine whether a width of the current variation is equal to or greater than a preset reference variation width while detecting variation in the current based on a continuously received digital voltage. If the width of the current variation is equal to or greater than the preset reference variation width, it can be determined that the on/off state of the external apparatus has changed.

If it is determined that the on/off state of the external apparatus has changed, the controller may compare the DC voltage before the change with the DC voltage after the change. As a result, if the DC voltage after the change is equal to or greater than the DC voltage before the change, it can be determined that the external apparatus is switched on. If the DC voltage after the change is less than the DC voltage before the change, it can be determined that the external apparatus is switched off.

If it is determined that the on/off state of the external apparatus has changed, the controller may compare the DC voltage after the change with a preset reference voltage. As a result, if the DC voltage after the change is equal to or greater than the preset reference voltage, it can be determined that the external apparatus is switched on. If the DC voltage after the change is less than the preset reference voltage, it can be determined that the external apparatus is switched off.

If it is determined that the external apparatus is switched off, the controller may calculate a time during which the external apparatus remains switched off until being switched on again. At this time, if the time during which the external apparatus is switched off exceeds a preset reference time, the controller may cut off the AC voltage supplied to the external apparatus.

The broadcast receiving apparatus may further include a micom, which selectively cuts off the power supplied to components inside the broadcast receiving apparatus based on power saving data. If the time during which the external apparatus is switched off exceeds the preset reference time, the controller may provide the power saving data to a micom.

The broadcast receiving apparatus may further include an interface to set the preset reference time and the power saving data.

If an operation command is received to operate the broadcast receiving apparatus, the micom may supply power to the components contained in the power saving data, and transmit a power saving mode termination command to the controller.

The broadcast receiving apparatus may further include a switching part, which supplies or cuts off the AC voltage inputted from the sensor to the external apparatus under control of the controller. If the power saving mode termination command is received, the controller may return the external apparatus to a state it was in prior to entering a power saving mode and control the switching part to supply the AC voltage to the external apparatus.

The foregoing and/or other aspects and utilities of the present general inventive concept may also be achieved by providing a power control method of a broadcast receiving apparatus, the method including detecting variation in an input alternating current (AC) voltage and outputting a direct current (DC) voltage corresponding to a detection result, and detecting variation in current based on a digital voltage corresponding to the DC voltage and determining an on/off state of an external apparatus, connected to the broadcast receiving apparatus, according to the detection result.

The method may further include converting the DC voltage to the digital voltage. The determining may include detecting the variation in the current based on the converted digital voltage to determine the on/off state of the external apparatus.

The determining may include determining whether a width of the current variation is equal to or greater than a preset reference variation width while detecting the variation in the current based on the continuously received digital voltage. If the width of the current variation is equal to or greater than the preset reference variation width, it is determined that the on/off state of the external apparatus has changed.

The determining may include comparing the DC voltage before the change with the DC voltage after the change if it is determined that the on/off state of the external apparatus has changed, determining that the external apparatus is switched on if the DC voltage after the change is equal to or greater than the DC voltage before the change, and determining that the external apparatus is switched off if the DC voltage after the change is less than the DC voltage before the change.

The determining may include comparing the DC voltage after the change with a preset reference voltage if it is determined that the on/off state of the external apparatus has changed, determining that the external apparatus is switched on if the DC voltage after the change is equal to or greater than the preset reference voltage, and determining that the external apparatus is switched off if the DC voltage after the change is less than the preset reference voltage.

The determining may include calculating a time during which the external apparatus remains switched off until being switched on again; and controlling the AC voltage supplied to the external apparatus to be cut off if the time during which the external apparatus is switched off exceeds a preset reference time.

The method may further include controlling the power supplied to components inside the broadcast receiving apparatus to be selectively cut off based on power saving data. If the time during which the external apparatus is switched off exceeds the preset reference time, the determining may include providing the power saving data during the controlling.

The method may further include setting the preset reference time and the power saving data.

If an operation command is received to operate the broadcast receiving apparatus, the controlling may include supplying power to the components contained in the power saving data, and transmitting a power saving mode termination command.

The method may further include switching the AC voltage input during the outputting of the DC voltage to be supplied or cut off to the external apparatus according to the results of the determining. If the power saving mode termination command is received, the determining may include returning the external apparatus to a state it was in prior to entering the power saving mode and controlling switching to supply the AC voltage to the external apparatus.

The foregoing and/or other aspects and utilities of the present general inventive concept may also be achieved by providing a computer-readable medium having embodied thereon a computer program to execute a method of power control method of a broadcast receiving apparatus, the method including detecting variation in an input alternating current (AC) voltage and outputting a direct current (DC) voltage corresponding to a detection result, and detecting variation in current based on a digital voltage corresponding to the DC voltage and determining an on/off state of an external apparatus, connected to the broadcast receiving apparatus, according to the detection result.

The foregoing and/or other aspects and utilities of the present general inventive concept may also be achieved by providing a broadcast receiving system including an external device and a broadcast receiving device including a controller to detect a current variation based on an input from a sensor and to control a power on/off state of the external device which is connected to the broadcast receiving device according to the detected result.

The foregoing and/or other aspects and utilities of the present general inventive concept may also be achieved by providing a power control method of a broadcast receiving system, the method including detecting a variation in a power supply, determining whether an on/off state of an external device has changed based on the detected variation, if it is determined that the external device is off, calculating a time period during which the external device is off, and controlling a power saving mode of the broadcast receiving system if the calculated time period is greater than a predetermined time period.

The foregoing and/or other aspects and utilities of the present general inventive concept may also be achieved by providing a computer-readable medium having embodied thereon a computer program to execute a power control method of a broadcast receiving apparatus, the method including detecting a variation in a power supply, determining whether an on/off state of an external device has changed based on the detected variation, if it is determined that the external device is off, calculating a time period during which the external device is off, and controlling a power saving mode of the broadcast receiving system if the calculated time period is greater than a predetermined time period.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a flowchart illustrating operation of the broadcast receiving apparatus according to an embodiment of the present general inventive concept.

Throughout the drawings, the same drawing reference numerals will be understood to refer to the same elements, features and structures.

DETAILED DESCRIPTION OF THE PREFERRED EMBODIMENTS

Figure 1:
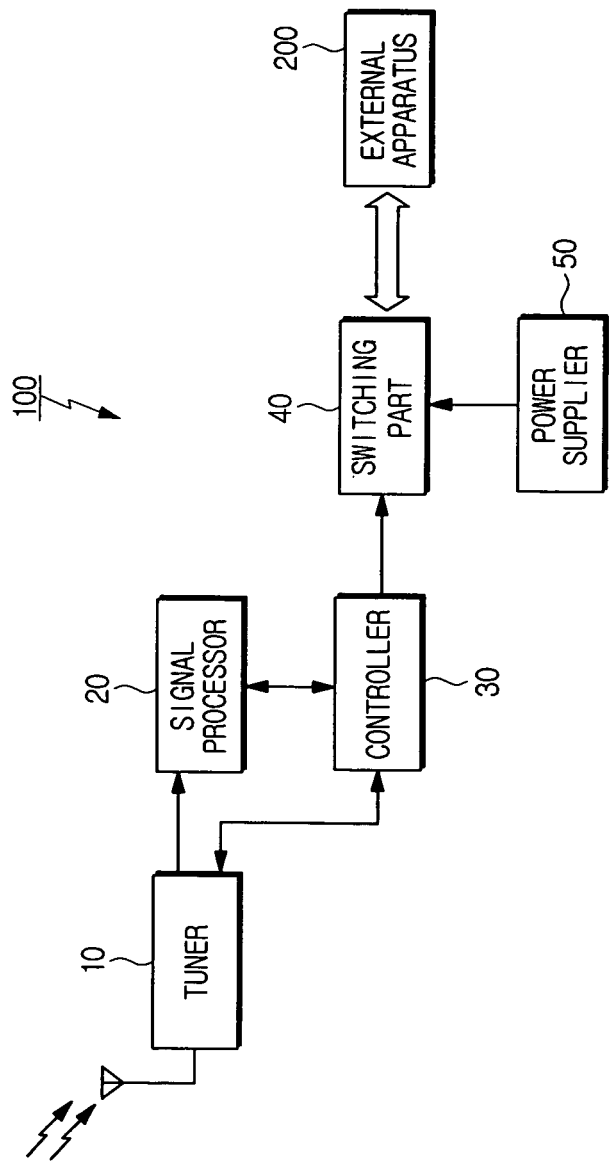
FIG. 1 is a block diagram illustrating a conventional broadcast receiving apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
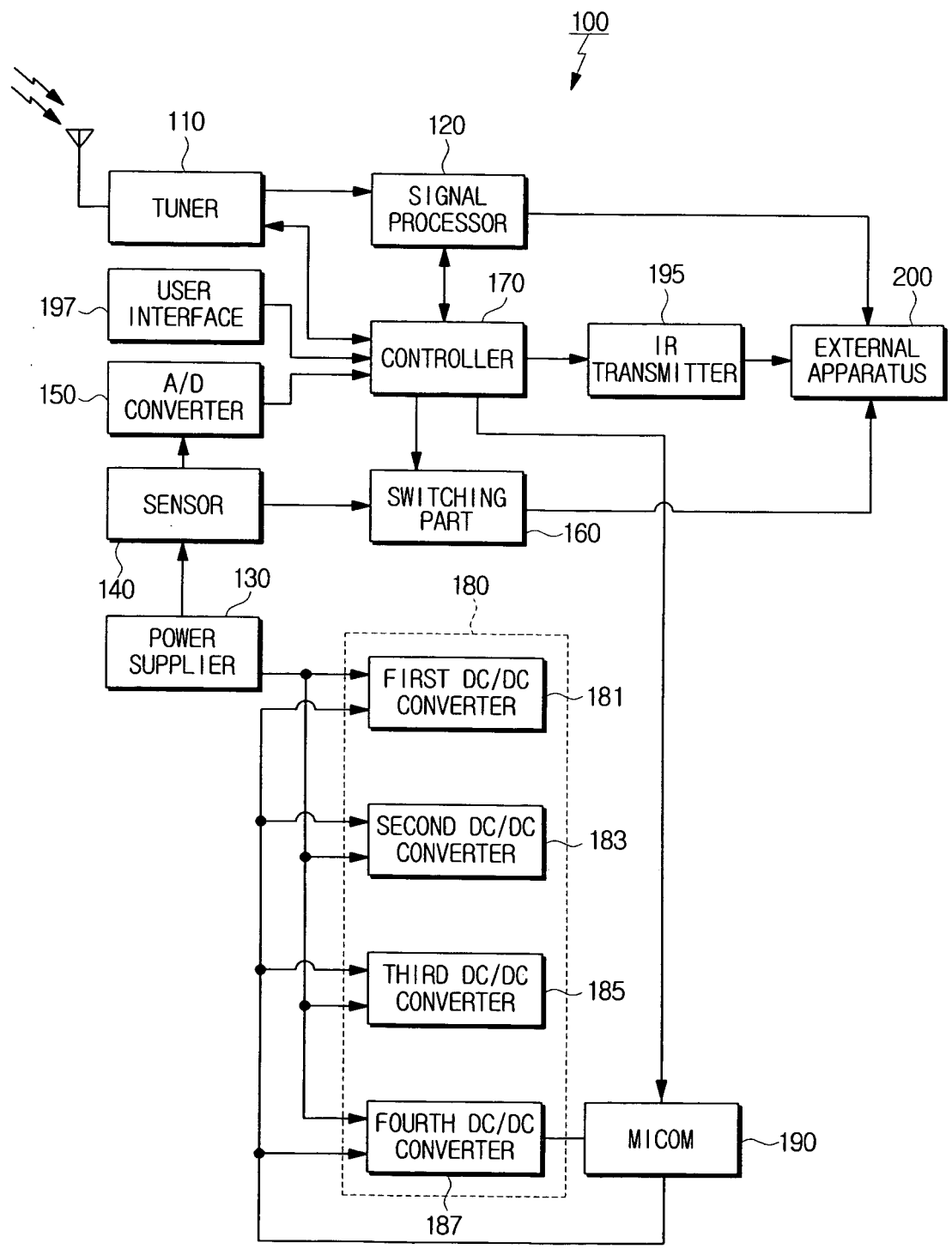
FIG. 2 is a block diagram illustrating a broadcast receiving apparatus according to an embodiment of the present general inventive concept.

FIG. 2 is a block diagram illustrating a broadcast receiving apparatus according to an exemplary embodiment of the present general inventive concept. The broadcast receiving apparatus in FIG. 2 includes a tuner 110, a signal processor 120, a power supplier 130, a sensor 140, an analog-to-digital (A/D) converter 150, a switching part 160, a controller 170, a direct current-to-direct current (DC/DC) converter 180, a micom or power supply controller 190, an IR transmitter 195, and an interface 197.

The tuner 110 receives and tunes a broadcast signal corresponding to a channel selected by a user from the broadcasting station.

The signal processor 120 performs signal-processing on the broadcast signal provided from the tuner 110 to separate video, audio and data signals. The separated signals are displayed on an external apparatus 200 under the control of the controller 170 described below. In this case, a television is preferably used as the external apparatus 200 connected to the broadcast receiving apparatus 100, but the present general inventive concept is not necessarily limited thereto.

The power supplier 130 supplies power to operate the broadcast receiving apparatus 100.

The sensor 140 detects variation in an alternating current (AC) voltage input from the power supplier 130, and outputs a direct current (DC) voltage corresponding to the detection result. The sensor 140 outputs the AC voltage input from the power supplier 130 to the switching part 160 described below.

The A/D converter 150 converts the DC voltage received from the sensor 140 to a digital voltage to output the digital voltage.

The switching part 160 supplies or cuts off the AC voltage input from the sensor 140 to the external apparatus 200 under the control of the controller 170 described below. At this time, the switching part 160 supplies or cuts off the AC voltage to the external apparatus 200 through an output terminal outlet included in the broadcast receiving apparatus.

The controller 170 controls the signal processor 120 to output the audio and video signals processed in the signal processor 120 to the external apparatus 200. Additionally, the controller 170 determines the on/off state of the external apparatus 200 based on the digital voltage received from the A/D converter 150.

Specifically, the controller 170 detects a variation in current based on the digital voltage converted in the A/D converter 150, and determines the on/off state of the external apparatus 200 according to the detection result. In other words, the controller 170 determines whether a width of the current variation is equal to or greater than a preset reference variation width while detecting the variation in the current based on a continuously received digital voltage. If the width of the current variation is equal to or greater than the preset reference variation width, it is determined that the on/off state of the external apparatus 200 has changed.

If it is determined that the on/off state of the external apparatus 200 has changed, the controller 170 compares the DC voltage before the change with the DC voltage after the change. As a result, if the DC voltage after the change is equal to or greater than the DC voltage before the change, it is determined that the external apparatus 200 is switched on. If the DC voltage after the change is less than the DC voltage before the change, it is determined that the external apparatus 200 is switched off.

Additionally, if it is determined that the external apparatus 200 is switched off, the controller 170 calculates a time during which the external apparatus 200 remains switched off until being switched on. At this time, if the time during which the external apparatus is switched off exceeds a preset reference time, the controller 170 controls the switching part 160 to cut off the power supplied to the external apparatus 200. At this time, a default value of the preset reference time may be set during production of the broadcast receiving apparatus 100, but may also be set by a user.

Furthermore, if the time during which the external apparatus is switched off exceeds the preset reference time, the controller 170 transmits preset power saving data to the micom 190 described below, and converts the broadcast receiving apparatus 100 to a power saving mode. The power saving data refers to preset data to supply and cut off the power supplied to components of the broadcast receiving apparatus 100 connected to first to fourth DC/DC converters 181, 183, 185 and 187. At this time, a default value of the power saving data may be set during production of the broadcast receiving apparatus 100, but may also be set by a user.

When a power saving mode termination command is received from the micom 190 described below, the controller 170 returns the external apparatus to a state it was in prior to entering the power saving mode. In this case, the controller 170 transmits ON data to operate the external apparatus 200 to the IR transmitter 195 described below. In other words, when power is supplied to the broadcast receiving apparatus 100, the controller 170 controls the switching part 160 to automatically supply power to the external apparatus 200, and controls the IR transmitter 195 to output audio and video signals to the external apparatus 200.

The micom 190 controls the first DC/DC converter 181 to the fourth DC/DC converter 187 based on the power saving data received from the controller 170.

Specifically, the micom 190 controls the first to third DC/DC converters 181 to 185 to selectively cut off the power supplied to components contained in the power saving data, based on the power saving data received from the controller 170. At this time, the micom 190 controls the fourth DC/DC converter 187 so that power is constantly supplied to the micom 190. It is possible that the first DC/DC converter 181 controls the power supplied to the controller 170 and a memory device (not illustrated), the second DC/DC converter 183 controls the power supplied to a power switch and universal serial bus (USB) installed outside the broadcast receiving apparatus 100, and the third DC/DC converter 185 controls the power supplied to a high definition multimedia interface (HDMI) and a hard disk, but the present general inventive concept is not necessarily limited thereto.

Additionally, when an operation command is received through a power switch (not illustrated) or a remote controller (not illustrated) installed outside the broadcast receiving apparatus 100 to operate the broadcast receiving apparatus 100, the micom 190 controls the first to third DC/DC converters 181 to 185 to supply power to the components contained in the preset power saving data. At this time, the micom 190 transmits the power saving mode termination command to the controller 170.

When the ON data is received from the controller 170, the IR transmitter 195 outputs the audio and video signals processed in the signal processor 120 to the external apparatus 200.

An interface 197 provides a user interface to set the preset reference time and the power saving data.

FIG. 3 is a flowchart illustrating an operation of the broadcast receiving apparatus of FIG. 2, according to an exemplary embodiment of the present general inventive concept. In FIG. 3, the sensor 140 of FIG. 2 detects the variation in the AC voltage input from the power supplier 130, and outputs the DC voltage corresponding to the detection result at operation S310. The sensor 140 outputs the AC voltage inputted from the power supplier 130 to the switching part 160 so that the power is supplied to the external apparatus 200.

Subsequently, the A/D converter 150 converts the DC voltage received from the sensor 140 to a digital voltage at operation S320.

The controller 170 detects the variation in the current based on the digital voltage received from the A/D converter 150, and as a result, if the width of the current variation is equal to or greater than a reference variation width at operation S330:Y, it is determined that the on/off state of the external apparatus 200 changed at operation S340.

If it is determined that the on/off state of the external apparatus 200 has changed, the controller 170 compares the DC voltage before the change with the DC voltage after the change. As a result, if the DC voltage after the change is equal to or greater than the DC voltage before the change, it is determined that the external apparatus 200 is switched on. If the DC voltage after the change is less than the DC voltage before the change, it is determined that the external apparatus 200 is switched off.

Next, if it is determined that the external apparatus 200 is switched off, the controller 170 calculates the time during which the external apparatus 200 remains switched off until being switched on again.

If the time during which the external apparatus is switched off exceeds the reference time at operation S350:Y, the controller 170 controls the switching part 160 to cut off the power supplied to the external apparatus 200, and transmits the preset power saving data to the micom 190 at operation S360. At this time, the power saving data refers to the preset data to supply and cut off the power supplied to components of the broadcast receiving apparatus 100 connected to the first DC/DC converter 181 to the fourth DC/DC converter 187. At this time, a default value of the power saving data may be set during production of the broadcast receiving apparatus 100, but may also be set by a user.

Specifically, if the time during which the external apparatus is switched off exceeds the reference time, the controller 170 transmits the preset power saving data to the micom 190, and the micom 190 controls the first to third DC/DC converters 181 to 185 to cut off the power supplied to each component of the broadcast receiving apparatus 100, which are contained in the power saving data. At this time, the micom 190 controls the fourth DC/DC converter 187 so that the power is constantly supplied to the micom 190.

It is desired that the first DC/DC converter 181 controls the power supplied to the controller 170 and a memory device (not illustrated), the second DC/DC converter 183 controls the power supplied to the power switch and the USB installed outside the broadcast receiving apparatus 100, and the third DC/DC converter 185 controls the power supplied to the HDMI and the hard disk, but the present general inventive concept is not necessarily limited thereto.

Additionally, if the time during which the external apparatus is switched off exceeds the preset reference time, the controller 170 converts the broadcast receiving apparatus 100 to the power saving mode at operation S370. In other words, if the time during which the external apparatus is switched off exceeds the reference time, the controller 170 cuts off the power supplied to the external apparatus 200 and the power supplied to the components of the broadcast receiving apparatus 100, and then converts to the power saving mode.

Subsequently, if the power saving mode termination command is received from the micom 190 at operation S380:Y, the controller 170 returns the external apparatus to the state it was in prior to entering the power saving mode at operation S390.

Specifically, when an operation command is received through the a power switch (not illustrated) or a remote controller (not illustrated) installed outside the broadcast receiving apparatus 100 to operate the broadcast receiving apparatus 100, the micom 190 controls the first to third DC/DC converters 181 to 185 to supply the power to the components contained in the preset power saving data, and transmits the power saving mode termination command to the controller 170.

When the power saving mode termination command is received, the controller 170 controls the switching part 160 to supply power to the external apparatus 200 automatically when the power is supplied to the broadcast receiving apparatus 100. Additionally, the controller 170 transmits the ON data to the IR transmitter 195 to operate the external apparatus 200 so that the audio and video signals are outputted to the external apparatus 200.

In operations S330, S350, and S380, if it is determined that the width of the current variation is less than the reference variation width at operation S330:N, the time during which the external apparatus is switched off is less than the reference time at operation S350:N, and the power saving mode termination command is not received at operation S380:N, the controller 170 maintains a current set state of the broadcast receiving apparatus 100 without change at operation S395.

In the broadcast receiving apparatus to minimize standby power and the method thereof according to the exemplary embodiments of the present general inventive concept, if it is determined that the on/off state of the external apparatus 200 has changed, the controller 170 compares the DC voltage after the change with a preset reference voltage. As a result, if the DC voltage after the change is equal to or greater than the reference voltage, it can be determined that the external apparatus 200 is switched on. If the DC voltage after the change is less than the reference voltage, it can be determined that the external apparatus 200 is switched off.

Additionally, in the broadcast receiving apparatus to minimize standby power and the method thereof according to the exemplary embodiments of the present general inventive concept, an active standby mode is provided to cut off the power supplied to each component of the broadcast receiving apparatus 100 based on the preset power saving data if it is determined that the external apparatus 200 is switched off, but the present general inventive concept is not limited thereto. Alternatively, a passive mode may be performed to cut off all power supplied to each component of the broadcast receiving apparatus 100 except the micom 190. In the active standby mode, the power is supplied to some components of the broadcast receiving apparatus 100 so that information received from a broadcasting station can be downloaded even though the broadcast receiving apparatus 100 is not used.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The method illustrated in FIG. 3 and/or operation of controller 170 can be stored in the computer-recorded medium in a form of computer-readable codes to perform the method when the computer reads the computer-readable codes of the recording medium.

As described above, according to the various exemplary embodiments of the present general inventive concept, it is possible to determine whether the external apparatus is switched on or off according to a variation in power supplied to the external apparatus, cut off the power supplied to the external apparatus based on the determination result, and selectively control the power supplied to components of the broadcast receiving apparatus based on power saving data.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents

What is claimed is:

1. A broadcast receiving apparatus comprising:
a sensor to detect variation in an input alternating current (AC) voltage and output a direct current (DC) voltage corresponding to the detection result;
a micom to selectively cut off power supplied to components related to an external apparatus inside the broadcast receiving apparatus based on power saving data comprising information on the components to which the power supplied is to be cut off; and
a controller to detect variation in current based on a digital voltage corresponding to the DC voltage, to determine, according to the detection result, an on/off state of an external apparatus connected to the broadcast receiving apparatus and to provide the power saving data to the micom based on the determined on/off state of the external apparatus,
wherein the power saving data is set by a user input, and the components include at least one of a controller, a universal serial bus (USB), and a high definition multimedia interface (HDMI).

2. The apparatus as claimed in claim 1, further comprising:
an analog-to-digital (A/D) converter to convert the DC voltage to the digital voltage,
wherein the controller detects the variation in the current based on the digital voltage received from the A/D converter to determine the on/off state of the external apparatus.

3. The apparatus as claimed in claim 1, wherein the controller determines whether a width of the current variation is equal to or greater than a preset reference variation width while detecting the variation in the current based on a continuously received digital voltage, and determines that the on/off state of the external apparatus has changed if the width of the current variation is equal to or greater than the preset reference variation width.

4. The apparatus as claimed in claim 3, wherein the controller compares the DC voltage before the change with the DC voltage after the change if it is determined that the on/off state of the external apparatus has changed, and as a result, determines that the external apparatus is switched on if the DC voltage after the change is equal to or greater than the DC voltage before the change, and determines that the external apparatus is switched off if the DC voltage after the change is less than the DC voltage before the change.

5. The apparatus as claimed in claim 3, wherein the controller compares the DC voltage after the change with a preset reference voltage if it is determined that the on/off state of the external apparatus has changed, and as a result, determines that the external apparatus is switched on if the DC voltage after the change is equal to or greater than the preset reference voltage, and determines that the external apparatus is switched off if the DC voltage after the change is less than the preset reference voltage.

6. The apparatus as claimed in claim 1, wherein the controller calculates a time during which the external apparatus remains switched off until being switched on again if it is determined that the external apparatus is switched off, and cuts off the AC voltage supplied to the external apparatus if the time during which the external apparatus is switched off exceeds a preset reference time.

7. The apparatus as claimed in claim 6, wherein the controller provides the power saving data to the micom if the time during which the external apparatus is switched off exceeds the preset reference time.

8. The apparatus as claimed in claim 7, further comprising:
an interface to set the preset reference time and the power saving data.

9. The apparatus as claimed in claim 7, wherein the micom supplies power to the components contained in the power saving data, and transmits a power saving mode termination command to the controller if an operation command is received to operate the broadcast receiving apparatus.

10. The apparatus as claimed in claim 9, further comprising:
a switching part to supply or cut off the AC voltage inputted from the sensor to the external apparatus under control of the controller,
wherein the controller returns the external apparatus to a state it was in prior to entering a power saving mode and controls the switching part to supply the AC voltage to the external apparatus if the power saving mode termination command is received.

11. The broadcast receiving apparatus as claimed in claim 1, the component further comprising:
a connector through which the broadcast receiving apparatus provides voltage to the external apparatus.

12. A power control method of a broadcast receiving apparatus, the method comprising:
detecting variation in an input alternating current (AC) voltage and outputting a direct current (DC) voltage corresponding to a detection result;
detecting variation in current based on a digital voltage corresponding to the DC voltage;
determining an on/off state of an external apparatus connected to the broadcast receiving apparatus according to the detection result; and
controlling power supplied to components related to the external apparatus inside the broadcast receiving apparatus to selectively cut off power supplied to the components based on power saving data provided according to the determined on/off state of the external apparatus, the power saving data comprising information on the components to which the power supplied is to be cut off,
wherein the power saving data is set by a user input, and the components include at least one of a controller, a universal serial bus (USB), and a high definition multimedia interface (HDMI).

13. The method as claimed in claim 12, further comprising: converting the DC voltage to the digital voltage,
wherein the determining comprises detecting the variation in the current based on the converted digital voltage to determine the on/off state of the external apparatus.

14. The method as claimed in claim 12, wherein the determining comprises:
determining whether a width of the current variation is equal to or greater than a preset reference variation width while detecting the variation in the current based on a continuously received digital voltage; and
determining that the on/off state of the external apparatus has changed if the width of the current variation is equal to or greater than the preset reference variation width.

15. The method as claimed in claim 14, wherein the determining the on/off state of the external apparatus comprises:
comparing the DC voltage before the change with the DC voltage after the change if it is determined that the on/off state of the external apparatus has changed;
determining that the external apparatus is switched on if the DC voltage after the change is equal to or greater than the DC voltage before the change; and
determining that the external apparatus is switched off if the DC voltage after the change is less than the DC voltage before the change.

16. The method as claimed in claim 14, wherein the determining the on/off state of the external apparatus comprises:
comparing the DC voltage after the change with a preset reference voltage if it is determined that the on/off state of the external apparatus has changed;
determining that the external apparatus is switched on if the DC voltage after the change is equal to or greater than the preset reference voltage; and
determining that the external apparatus is switched off if the DC voltage after the change is less than the preset reference voltage.

17. The method as claimed in claim 12, wherein the determining the on/off state of the external apparatus comprises:
calculating a time during which the external apparatus remains switched off until being switched on again; and
controlling the AC voltage supplied to the external apparatus to be cut off if the time during which the external apparatus is switched off exceeds a preset reference time.

18. The method as claimed in claim 17,
wherein the determining the on/off state of the external apparatus comprises providing the power saving data during the controlling if the time during which the external apparatus is switched off exceeds the preset reference time.

19. The method as claimed in claim 18, further comprising: setting the preset reference time and the power saving data.

20. The method as claimed in claim 18, wherein the controlling comprises:
supplying power to the components contained in the power saving data; and
transmitting a power saving mode termination command if an operation command is received to operate the broadcast receiving apparatus.

21. The method as claimed in claim 20, further comprising:
switching the AC voltage input during the outputting of the DC voltage to be supplied or cut off to the external apparatus according to the results of the determining,
wherein the determining the on/off state of the external apparatus comprises returning the external apparatus to a state it was in prior to entering the power saving mode and controlling switching to supply the AC voltage to the external apparatus if the power saving mode termination command is received.

22. The apparatus as claimed in claim 7, wherein the power saving data includes information indicating whether to supply or cut off power to the components.

23. A non-transitory computer-readable medium having embodied thereon a computer program to execute a power control method of a broadcast receiving apparatus, the method comprising:
detecting variation in an input alternating current (AC) voltage and outputting a direct current (DC) voltage corresponding to a detection result;
detecting variation in currents based on a digital voltage corresponding to the DC voltage;
determining an on/off state of an external apparatus connected to the broadcast receiving apparatus according to the detection result; and
controlling power supplied to components related to the external apparatus inside the broadcast receiving apparatus to selectively cut off power supplied to the components based on power saving data provided according to the determined on/off state of the external apparatus, the power saving data comprising information on the components to which the power supplied is to be cut off,
wherein the power saving data is set by a user input, and the components include at least one of a controller, a universal serial bus (USB), and a high definition multimedia interface (HDMI).

* * * * *